(12) United States Patent
Magzoub et al.

(10) Patent No.: US 9,676,669 B1
(45) Date of Patent: Jun. 13, 2017

(54) METHOD OF PRODUCING SODIUM BENTONITE

(71) Applicant: KING FAHD UNIVERSITY OF PETROLEUM AND MINERALS, Dhahran (SA)

(72) Inventors: Musaab Ibrahim Magzoub, Dhahran (SA); Mustafa Saleh Nasser, Dhahran (SA); Ibnelwaleed Ali Hussein, Dhahran (SA); Mohamed Ahmed Nasr Eldin Mahmoud, Dhahran (SA); Abdullah Saad Sultan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/953,916

(22) Filed: Nov. 30, 2015

(51) Int. Cl.
*C09K 8/03* (2006.01)
*C04B 33/04* (2006.01)
*B28C 1/04* (2006.01)

(52) U.S. Cl.
CPC .............. *C04B 33/04* (2013.01); *B28C 1/04* (2013.01); *C09K 8/032* (2013.01); *C04B 2235/349* (2013.01); *C09K 2208/34* (2013.01)

(58) Field of Classification Search
None
See application file for complete search history.

(56) References Cited

U.S. PATENT DOCUMENTS

| | | | | |
|---|---|---|---|---|
| 2,724,696 A | * | 11/1955 | Ratcliffe | C04B 33/13 423/100 |
| 2,948,678 A | * | 8/1960 | Turner | C04B 33/13 507/118 |
| 4,371,626 A | * | 2/1983 | Hentz | C04B 14/104 106/468 |

FOREIGN PATENT DOCUMENTS

| AU | 566345 B | 10/1987 |
|---|---|---|
| CN | 1061946 C | 2/2001 |

OTHER PUBLICATIONS

N. Yildiz, et al., "The effect of the electrolyte concentration and pH on the rheological properties of the original and the $Na_2CO_3$-activated Kütahya bentonite", Applied Clay Science, http://www.sciencedirect.com/science/article/pii/S016913179900006X?np=y, vol. 14, Issue 5-6, Jul. 1999, pp. 319-327 (Abstract only).

S. Kaufhold, et al., "Comparison of methods for distinguishing sodium carbonate activated from natural sodium bentonites", Applied Clay Science, vol. 86, 2013, pp. 23-37.

* cited by examiner

*Primary Examiner* — Jeffrey Washville
(74) *Attorney, Agent, or Firm* — Oblon, McClelland, Maier & Neustadt, L.L.P.

(57) ABSTRACT

Method of converting calcium bentonite to sodium bentonite that is suitable for use as drilling mud or a cement additive. After the addition of a calcium bentonite sample to a prepared soda ash solution at predetermined soda ash/bentonite weight ratios, the bentonite suspension is continuously heated and stirred for up to 24 h. The heating and stirring are crucial towards enhancing the sodium activation of the bentonite, as well as other rheological properties of the bentonite.

16 Claims, 14 Drawing Sheets

METHOD OF PRODUCING SODIUM BENTONITE

BACKGROUND OF THE INVENTION

Technical Field

The present invention relates to a method of preparing sodium bentonite. Specifically, calcium bentonite is converted into sodium bentonite by a combination of chemical, thermal and mechanical treatment procedures. The produced sodium bentonite is suitable for but not limited to oil and gas drilling and cementing applications.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Bentonite is a natural clay consisting primarily of montmorillonite that is usually formed from weathering of volcanic ash in the presence of water. There are different types of bentonite, each named after the respective dominant element, such as potassium (K), sodium (Na), calcium (Ca), magnesium (Mg) and aluminum (Al).

Na-bentonite expands up to 15 times its volume when wet, adsorbing as much as several times its dry mass in water. The excellent colloidal and adsorbent properties of Na-bentonite have popularized its use, compared to other types of bentonite, in drilling mud or drilling fluid for oil and gas wells and boreholes for geotechnical and environmental investigations. Na-bentonite is used as a viscofier or lubricant and in water control to reduce filtration loss. Further, the mixing of Na-bentonite in the drilling fluid helps to cool the cutting tools, to remove the soil and rock cuttings, to support the borehole and to prevent it from collapsing through the formation of a mud cake. Most high-grade natural Na-bentonite in the United States, which is the world's largest bentonite producer, is produced from the western part of the country in area between the Black Hills of South Dakota and the Bighorn Basin of Wyoming. In addition to drilling fluid applications, Na-bentonite is also useful as a sealant, providing a self-sealing, low permeability barrier, for example, at the base of landfills.

Ca-bentonite, which is found abundantly in the southern part of the United States such as Mississippi and Alabama, also has good adsorbent properties but is only capable of swelling 2-3 times of its unwetted volume.

Researchers and bentonite producers have attempted to utilize their local resources of bentonite. For example, different methods have been used to purify or treat raw bentonite, such as dry-sieving, wet-sieving, dispersing in hexametaphosphate solutions, sedimentation and mixing with soda ash. These attempts have been found to be time-consuming or have low efficacy:

Al-Homadhi et al. attempt to treat local bentonite with soda ash and to upgrade the treated bentonite with extenders or additives such as salt and polymers. The final modified bentonite did not satisfy API specifications for evaluation of drilling mud (Al-Homadhi, E. S. "Improving Local Bentonite Performance for Drilling Fluids Applications", Society of Petroleum Engineers Saudi Arabia Section Technical Symposium, 7-8 May 2007, Dhahran Saudi Arabia—incorporated herein by reference in its entirety).

In Australian Pat. No. AU566345B (incorporated herein by reference in its entirety), magnesium- and/or calcium-containing bentonite are agglomerated by soda ash treatment to produce Na-bentonite for laundry applications. The produced Na-bentonite has not been evaluated for drilling fluid applications.

Chinese Pat. No. CN1061946C (incorporated herein by reference in its entirety) describes a process of producing Na-bentonite from Ca-bentonite by soda ash treatment followed by ion exchange reaction. The produced Na-bentonite also has not been evaluated for drilling fluid applications.

Yildiz et al. activate local Ca-bentonite with soda ash to increase the Na/Ca ratio and disperse the activated bentonite in sodium hexametaphosphate solutions to increase the stability of the suspension. The rheological properties of the activated bentonite are tested at different sodium hexametaphosphate and NaCl concentrations but not according to the API standards for drilling fluids (Yildiz, N., Sarikaya, Y., Ç alimli, A. "The effect of the electrolyte concentration and pH on the rheological properties of the original and the $Na_2CO_3$-activated Kutahya bentonite" Applied Clay Science 14(5-6):319-327, 1999—incorporated herein by reference in its entirety)

Kaufhold et al. activate Mg/Ca-bentonite with sodium carbonate (soda ash) in both dry state and in solution with excessive water with no heating. The authors conclude that despite the addition of the sodium carbonate in excess (1-5 wt. %), the activation process whether it is conducted in a dry state or a wet state may be incomplete and partial (Kaufhold, S., Emmerich, K., Dohrmann, R., Steudel, A., Ufer, K. "Comparison of methods for distinguishing sodium carbonate activated from natural sodium bentonites" Applied Clay Science 86:23-37, 2013—incorporated herein by reference in its entirety).

Karagüzel et al. activate local bentonite with 1.5-3 wt. % soda ash and 0.5% MgO without heating and a prior purification step. The combination of soda ash and MgO is found to influence the viscosities, swelling indices and filtration losses to produce an activated bentonite that satisfies drilling mud standards (Karagüzel, C. Ç etinel, T., Boylu, F., Ç inku, K., Ç elik, M. S. "Activation of Na, Ca)-bentonites with soda and MgO and their utilization as drilling mud—incorporated herein by reference in its entirety).

In view of the foregoing, it is evident that treatment of raw non-sodium bentonite with soda ash alone can only improve characteristics such as swelling to a limited extent that would not suffice for oil and gas drilling applications. Accordingly, it will be beneficial to provide methods of producing Na-bentonite from local, raw Ca- and/or Mg-bentonite for drilling mud applications. Preferably, a minimal number of additive compounds is added to the raw bentonite to modify the rheological properties so that the produced Na-bentonite maintains a high purity.

BRIEF SUMMARY OF THE INVENTION

In one aspect, there is provided a method of converting calcium bentonite to sodium bentonite. The method comprises adding a calcium bentonite sample to a sodium carbonate aqueous solution to form a bentonite suspension and continuously heating and stirring the bentonite suspension to form sodium bentonite and calcium carbonate.

In one embodiment, the sodium carbonate aqueous solution has a concentration of no more than 1% by weight.

In one embodiment, the continuous heating and stirring is carried out at 60-80° C. for 6-24 hours.

In one embodiment, the bentonite suspension comprises the sodium carbonate and the calcium bentonite at a sodium carbonate/calcium bentonite weight ratio of 1:7 to 1:23.

In one embodiment, the sodium bentonite formed has an apparent viscosity of at least 15 cP.

In one embodiment, the sodium bentonite formed has a yield point of no more than 30 lb/100 ft$^2$.

In one embodiment, the sodium bentonite formed has a Na/Ca molar ratio of at least 2.5.

In one embodiment, the sodium bentonite formed has a viscometer dial reading of 33-35 lb/100 ft$^2$ at 300 rpm and 39-40 lb/100 ft$^2$ at 600 rpm.

In one embodiment, the method is effective in increasing the water control of the calcium bentonite sample by 35-70%.

In one embodiment, the method is effective in increasing the average particle size of the Ca-bentonite sample by more than 500 times.

In one embodiment, the Ca-bentonite sample is a raw bentonite sample that has not been purified.

In one embodiment, the Ca-bentonite sample has been purified by at least one method selected from the group consisting of dry-sieving, wet-sieving, dispersion in deionized water with hexametaphosphate, dispersion in deionized water without hexametaphosphate and sedimentation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
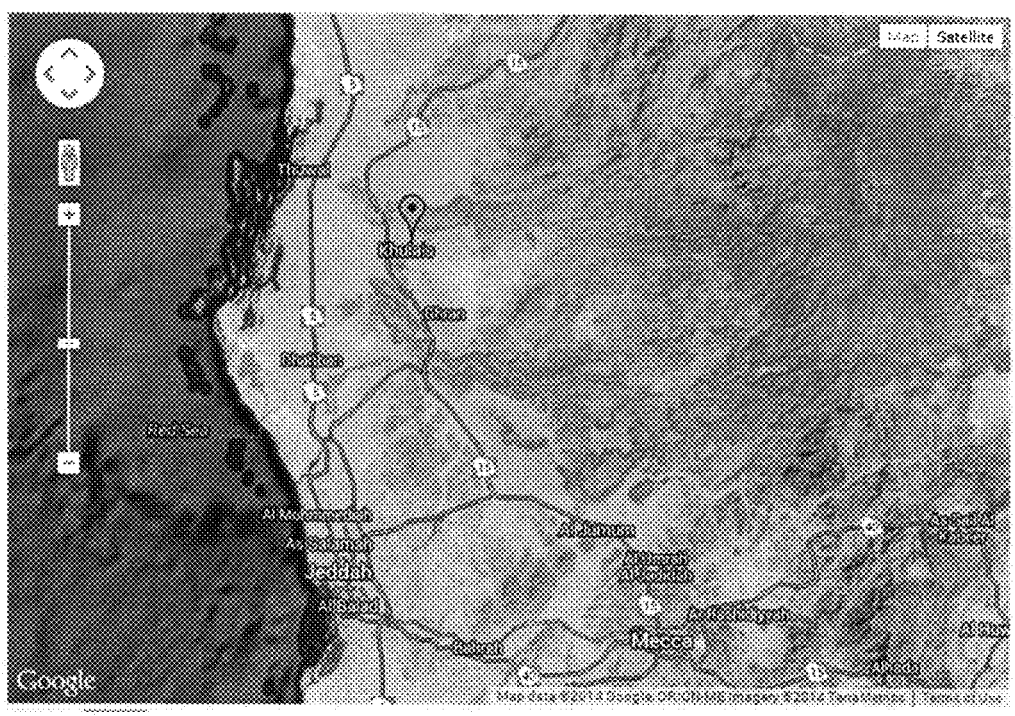
FIG. 1 is a map image showing the location of Khulays area in Saudi Arabia where raw bentonite can be derived and converted into Na-bentonite according to one embodiment.

Referring now to the drawings, wherein like reference numerals designate identical or corresponding parts throughout the several views.

The present invention pertains to a method of converting or upgrading calcium (Ca) bentonite to sodium (Na) bentonite. Advantageously, the produced Na-bentonite is of drilling mud grade, satisfying the specifications and standards that are set forth in the American Petroleum Institute (API) Recommended Practice 13B-1 (for Field Testing Water-Based Drilling Fluids), which is incorporated herein by reference in its entirety.

In the method, a sodium carbonate (soda ash) solution is initially prepared by dissolving sodium carbonate powder or crystals in water (preferably distilled water) to a final sodium carbonate concentration of no more than 1 wt. % (weight percentage based on total weight of water), preferably 0.1-1 wt. %, more preferably 0.2-0.9 wt. %, more preferably 0.3-0.6 wt. %, more preferably 0.4-0.5 wt. %, most preferably 0.28-0.86 wt. %. The sodium carbonate used can be anhydrous or occur in hydrated forms (most commonly as monohydrate, decahydrate or crystalline heptahydrate). The soda ash solution acts as a source of carbonate and sodium ions for an ion exchange process with Ca-bentonite where calcium from Ca-bentonite can be precipitated as calcium carbonate A Ca-bentonite sample is then added to the prepared sodium carbonate solution to a final bentonite concentration of 5-10 wt. % (weight percentage based on total weight of water), preferably 5-8 wt. %, more preferably 6-7 wt. %. The amount of sodium carbonate and the amount of bentonite present in the bentonite suspension ranges from 1:6 to 1:25 (sodium carbonate/bentonite weight ratio), preferably 1:7 to 1:23, more preferably 1:10 to 1:23, even more preferably 1:20 to 1:23.

The Ca-bentonite sample is a raw, unpurified bentonite sample that has been dried to remove water. The Ca-bentonite sample has a moisture content no more than 10%, preferably 0.5-10%, more preferably 1-8%, even more preferably 1-5%. In some embodiments, a Ca-bentonite sample that has been purified using routine purification methods may be used. Such purification techniques include but are not limited to dry-sieving, wet-sieving, dispersing in deionized water with or without hexametaphosphate, sedimentation and combinations thereof. Sieves used in dry- or wet-sieving have U.S. sieve or mesh sizes ranging from 100 to 400 mesh, such as 100, 115, 150, 170, 200, 250, 270, 325 and 400. In some embodiments, the Ca-bentonite sample, when existing as a colloidal dispersion, has a zeta potential charge of −40 to −20 mV across a pH range of 3 to 12.

After the addition of the bentonite sample to the sodium carbonate solution, the bentonite suspension is then heated and stirred. The heating and stirring are critical towards at least the following phenomena: increase in bentonite platelet or particle size, the expansion the bentonite platelets for enhanced swelling and ion exchange, the penetration and invasion of the bentonite layers by water, movement of sodium ions to the surface of the bentonite layers allowing enhanced $Na^+$ activation and swelling, increase in Na/Ca ratio and changes in rheological properties (e.g. apparent viscosity, plastic viscosity, yield point, etc.). The continuous heating and stirring are especially advantageous in supplementing soda ash activation when the latter alone does not suffice to produce drilling mud grade bentonite that meets the API requirements.

The heating temperature is maintained at below 100° C., for example, 60-80° C., preferably 60-75° C., more preferably 65-70° C. The inventors are cautious about avoiding the water boiling point so as to minimize evaporation of the bentonite suspension. At the aforementioned temperature ranges, the thermal activation effects can be accomplished while water lost during evaporation can be easily compensated for by deionized water produced from the ion exchange to maintain the same bentonite concentration in the suspension.

The stirring mechanism can be achieved through the use of agitation devices such as but not limited to a magnetic agitator having a vessel containing the bentonite suspension and a magnetic bar rotating about a magnetic field disposed within the vessel. The stirring rotational speed is kept at 50-300 rpm, preferably 100-250 rpm, more preferably 200-250 rpm. In alternative embodiments, the bentonite suspension can be put into motion by a shaking mechanism.

The continuous heating and stirring needs to be sustained for at least 3 hours to achieve maximum viscosity increase. The bentonite suspension is continuously heated and stirred at 3-24 hours, preferably 6-24 hours, more preferably 9-24 hours, even more preferably 12-24 hours.

After the combination of soda ash activation, thermal treatment and mechanical stirring, the produced bentonite has a Na/Ca molar ratio of at least 2.5, for example 2.5-3.0, preferably 2.7-3.0, more preferably 2.8-3.0. The method is effective in increasing the Na/Ca ratio of a treated bentonite sample by at least 50%, preferably 50-65%. The average particle size (diameter) can be increased by more than 500 times, for example, from ~2.5 μm to 1000-1500 μm, preferably 1100-1400 μm, more preferably 1200-1300 μm, with more than 90% of the particles being in the average particle size range (1000-1500 μm). Without the continuous heating and stirring, soda ash activation alone increase the average particle size by only up to 8 times. Particle size distribution and average particle size can be determined by dry-sieve or wet-sieve analysis or any other equivalent grain size analysis.

The method described herein also provides a systematic increase in the various functional forms of viscosity that are used to measure rheological properties, including but not limited to apparent viscosity, plastic viscosity, shear viscosity and complex viscosity. These viscosity parameters can be measured with a viscometer or a rheometer, or derived by calculations. As used herein, "apparent viscosity" or "AV" ($\eta_{app}$) refers to the value of viscosity measured and evaluated at a nominal average value of the shear rate. Per API requirements, a water-based drilling mud should have an apparent viscosity of at least 15 cP. In one embodiment, the bentonite produced by the method herein has an apparent viscosity of 12-20 cP, preferably 15-20 cP, more preferably 17-20 cP (increased from about 1 cP).

As used herein, "plastic viscosity" or "PV" ($\eta_{pl}$) is a parameter of the Bingham plastic model and represents the viscosity of a drilling mud when extrapolated to infinite shear rate on the basis of the mathematics of the Bingham model. The bentonite product provided herein has a plastic viscosity of at least 5 cP, preferably 5-10 cP, more preferably 6-8 cP, even more preferably 6-7 cP. The Bingham model is expressed in the following equation:

$$\tau = \tau_0 + \eta_{pl}\dot{\gamma} \quad \text{(Equation 1)}$$

where $\tau$ is the measured shear stress at a shear rate of $\gamma$, $\tau_0$ is the yield stress or yield point, and $\eta_{pl}$ is the plastic viscosity.

As used herein, "yield point" (YP) is a critical shear stress point at which a material begins to deform plastically. The soda ash-heated stirring bentonite method can significantly increase the yield point to up to 30 lb/100 ft$^2$, for example, 10-30 lb/100 ft$^2$, preferably 20-30 lb/100 ft$^2$, more preferably 25-30 lb/100 ft$^2$. The maximum yield point per API specifications is 50 lb/100 ft$^2$.

In one embodiment, the bentonite produced by the method has a viscometer dial reading of about 35 lb/100 ft$^2$ at 300 rpm and about 40 lb/100 ft$^2$ at 600 rpm. Per API requirements, these readings have to be a minimum of 23 lb/100 ft$^2$ at 300 rpm and a minimum of 30 lb/100 ft$^2$ at 600 rpm.

The effects of continuous heating and stirring during soda ash activation can also be demonstrated by the increase in water control or reduction in filtration loss, i.e. filtration or filtrate volume measured at the end (30 min) of an API filtration test (low-pressure, low-temperature or high-pressure, high-temperature). The filtrate volume is further reduced by up to 50% when soda ash activation is accompanied by the continuous heating and stirring compared to soda ash activation without the heating and stirring, preferably 10-50%, more preferably 25-50%. The combined soda ash activation, heating and stirring results in an overall improvement in water control by up to 70%, preferably 35-70%, more preferably 55-70%.

The following examples further illustrate protocols undertaken to first investigate the suitability of bentonite samples derived from local clay deposits for use in oil and gas drilling fluid formulations. Examples 1-5 illustrate different purification methods and different techniques used to evaluate the efficacy of the purification methods, as well as the chemical composition and physical properties of raw and purified local bentonite. Examples 6-8 illustrate the upgrading of the local bentonite to Na-bentonite by a combination of soda ash, thermal and mechanical treatment procedures, as well as the API drilling fluid tests performed on the produced bentonite. These examples are presented for illustrative purposes only and are not intended as limiting the scope of the invention which is defined by the appended claims.

EXAMPLE 1

Rawbentonite Samples and Reference Samples

The Khulays area in Saudi Arabia, which is 95 km north of Jeddah as shown in the map image of FIG. 1, has the largest clay deposit in the Kingdom. The Khulays area is 800 m long×600 m wide, with a thickness of 200-300 m, and is estimated to contain 3 million tons of raw bentonite clay. The bentonite is 90% semctite with 10% kaolinite and/or 5-15% quartz (Spencer C. "The Khulays Bentonite Prospect." Ministry of Petroleum and Mineral Resources, Open-File Report BRGM-of-06-10, pp. 7-8, 1986—incorporated herein by reference in its entirety). Saudi Arabia has a huge bentonite clay deposit resources. This enormous amount of bentonite was enhanced for applications such as drilling fluid and cementing additive. The enhancement was necessary because the bentonite in the Khulays Area in North Jeddah Saudi Arabia is classified as Ca-bentonite, which is not suitable for drilling fluids or cementing applications, because it has low swelling capacity and low rheological properties.

Raw bentonite samples were collected from two different locations in the Khulays area and are designated as RB-1 and RB-2 herein.

Commercial bentonite was collected from a local supplier and used as a reference and standard for comparison of chemical composition and physical properties. The properties of raw bentonite were measured before and after treatment and compared with the standard. Standard grade bentonite as specified by API must meet some requirements. The quality-check-tests are performed. Bentonite suspension in distil water should satisfy API requirement, that viscometer dial reading at 600 r/min should be above or equal to 30, and yield point not more than 3 as per API 13I recommended practice (American Petroleum Institute Recommended Practice 13 B-1 for Field Testing Water-Based Drilling Fluids, Fourth Edition, pp. 11-13, March 2009—incorporated herein by reference in its entirety) and OCMA (Oil Company Materials Association) specifications.

X-ray diffraction (XRD) analyses were initially carried out to determine the mineralogical composition for raw bentonite, treated bentonite and standard bentonite samples. Scanning electron microscopy (SEM) was used to show the microstructural changes in clays with high spatial resolution The diffraction pattern of the XRD spectra is compared to known standard patterns to determine the contained minerals in the sample. The highest peak at 27.28, as shown in FIG. 2 corresponds with montmoriillonite while the other minor peaks are peaks for impurities.

Figure 2:
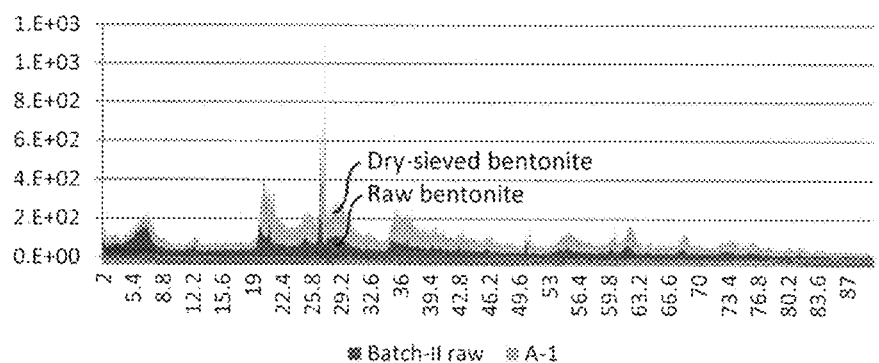
FIG. 2 shows the spectra from the X-ray diffraction (XRD) analyses of a raw bentonite sample and a raw bentonite sample that has been purified by dry-sieving.

As shown in FIG. 2, the analysis of XRD confirmed that the Khulays bentonite is mainly montmorillonite (~80%) with small amounts of kaolinite and quartz. SEM confirmed that in the raw bentonite $Al_2O_3/SiO_2$ ratio was 0.38 and Na/Ca ratio was 2.2. As per API specification for bentonite used in cements, the favorable bentonite properties should have: zero free water, lightweight cement system, and good rheological properties and controlled fluid loss (Grant, W. H. J., Rutledge, J. M., Gardner, C. A. "Quality of Bentonite and Its Effects on Cement-Slurry Performance" SPE Production Engineering 5(4):411-414 1990—incorporated herein by reference in its entirety). In drilling fluids, good montmorillonite clay forms a gel like structure at low solid content of 4-5% by weight (Rossi, S., Luckham, P. F., Zhu, S., Briscoe, B. J. "High-Pressure/High-Temperature Rheology of $Na^+$-MontmorilloniteClay Suspensions" Society of Petroleum Engineers (50725) pp. 243-257 1999—incorporated herein by reference in its entirety. The percentage composition of montmorillonite in clay is preferred to be >80%. But in most standard bentonite, the percentage is around 55-70% (Guven, N. Grim, R. "Bentonites: Geology, Mineralogy, Properties and Uses" Elsevier Developments in Sedimentology Vol. 24, 1978—incorporated herein by reference in its entirety). XRD for standard bentonite showed 54% montmorillonite, 12% illite, 7% muscovite and only 2%, 0.9%, 0.8% for gypsum, feldspar and quartz, respectively.

Low pressure/low temperature API filtration test was also used to evaluate bentonite quality. The suspension of bentonite in deionized water should not give more than 15 ml filtration volume as spurt loss when the sample is prepared by adding 22.5 g of bentonite to 350 ml of deionized water, mixed for 20 min and aged for 16 hours.

Figure 3:
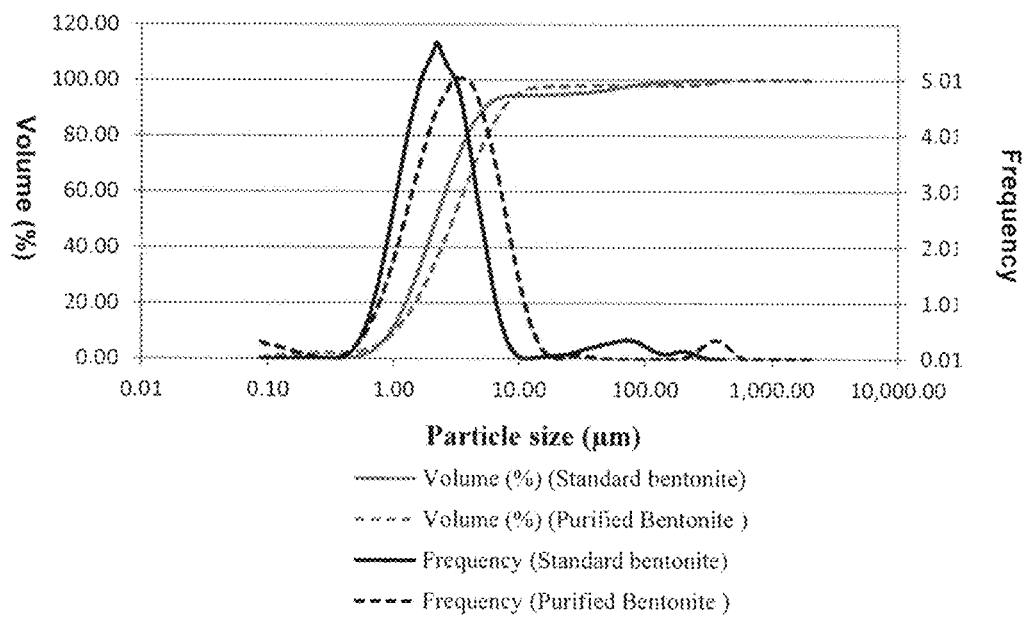
FIG. 3 shows the particle size distribution in terms of volume percentage and frequency for standard bentonite and purified bentonite.

Drilling mud grade bentonite is recommended to have uniform particle size distribution to avoid settlement of the larger size and phase separation. Generally, in drilling fluid particle size is important to determine. It is important to know whether there will be erosion or formation damage if bentonite is trapped in the formation pores and whether it will control fluid loss and allow effective bridging in mud cake. Particle size analysis for standard grade bentonite gave d(0.1)=1.69 μm, d(0.5)=4.692 μm and d(0.9)=29.055 μm (FIG. 3).

Montmorillonite particles are less than 2 μm. API and OCMA specifications recommended that drilling mud grade bentonite should have particle size less than 75 μm and the residue retained by a 200 mesh is less than 4% when 50 g of bentonite is sieved. The commercial reference samples used herein passed 47.1 g out of 50 g through 200 mesh which is 95%. For the local raw bentonite after purification and grinding, 100% of the sample passed through the 200 mesh.

EXAMPLE 2

Comparison of Raw Bentonite Purification Techniques

Raw bentonite exists in nature associated with many mineral impurities, with different composition due to the difference in location and environment. Elements other than montmorillonite should be removed (U.S. Pat. No. 3,865,240—incorporated herein by reference in its entirety). Purification of bentonite is the process of removing all impurities other than montmorillonite, including clay and non-clay impurities. Low water loses of slurry has great advantages in cementing formulation. Cements containing 8 to 12 percent bentonite allow controlling setting properties with good placement and increased performance. Drilling mud grade and cementing additives bentonite have certain specifications attributed to special chemical composition and physical properties. API and OCMA specification are the guidelines for evaluation of bentonite performance. Bentonite quality can be determined by the content of materials other than montmorillonite, besides the presence or absence of small amounts of extending polymers and the size and charge of the montmorillonite platelets.

As known in the art, pure bentonite can be obtained by dispersing the clay into deionized water, a method described by Ahmed et al. (Ahmed, A. S., N. Salahudeen, C. S. Ajinomoh, H. Hamza, A. Ohikere. "Studies on the Mineral and Chemical Characteristics of Pindiga Bentonitic Clay" Petroleum Technology Development Journal, 1:1-8, January 2012—incorporated herein by reference in its entirety). Raw bentonite is put into water and allowed to swell for 24 hours, then stirred for 30 min before it settled in a container for a period of time that is recommended by Stoke's law (10 h). After retention time the supreme solution will contain particles with sizes less than 2 μm which is collected and dried at 90° C., grounded and sieved through 200 meshes (Patel, H. A., Rajesh, R. S., Bajaj H. C., Jasra R. V. "Synthesis and characterization of organic bentonite using Gujarat and Rajasthan clays" Current Science (Ser. No. 00/113,891) 92(7), pp. 1004, April 2007—incorporated herein by reference in its entirety). Also, hydrogen peroxide ($H_2O_2$) has the ability to remove any organic and inorganic matter in the clay and can be used for purification, with only 10% $H_2O_2$ solution. The disodium ethylenediaminetetraacetate EDTA (Na$_2$EDTA) can be used to purify raw bentonite (U.S. Pat. No. 3,865,240—incorporated herein by reference in its entirety). Raw bentonite is crushed and screened and then dispersed in 0.01 M Na$_2$EDTA in 0.1 M NaCl. Then, the suspension is stirred for 30 minutes and the solution is left in a shaker for 30 minutes. The solution is allowed to stand for 48 h to obtain pure clay particles of size 2 μm which can be extracted through repeated sedimentation process followed by siphoning (James, O., Mesubi, M. A., Adekola, F. A., Odebunmi, E. O. Adekeye J. I. "Beneficiation and Characterization of a Bentonite from North-Eastern Nigeria" Journal of the North Carolina Academy of Science, 124(4):154-158, 2008—incorporated herein by reference in its entirety).

High grade bentonite like Khulays deposits containing over 90% montmorillonite may still require further treatment such as purification to match API requirements for drilling fluids and cementing. Ca-bentonite has lower swelling capacity compared to Na-bentonite. The best quality bentonite can produce organoclays or nanoclays used in polymers, paints and other industrial applications (Patel, H. A., Rajesh, R. S., Bajaj H. C., Jasra R. V. "Synthesis and characterization of organic bentonite using Gujarat and Rajasthan clays" Current Science (Ser. No. 00/113,891) 92(7), pp. 1004, April 2007—incorporated herein by reference in its entirety). For drilling mud sodium exchange bentonite is preferable and can be obtained by upgrading the Ca-bentonite by treatment with soda ash. The treatment increases sodium to calcium ratio and enhances the swelling characteristics.

Figure 4:
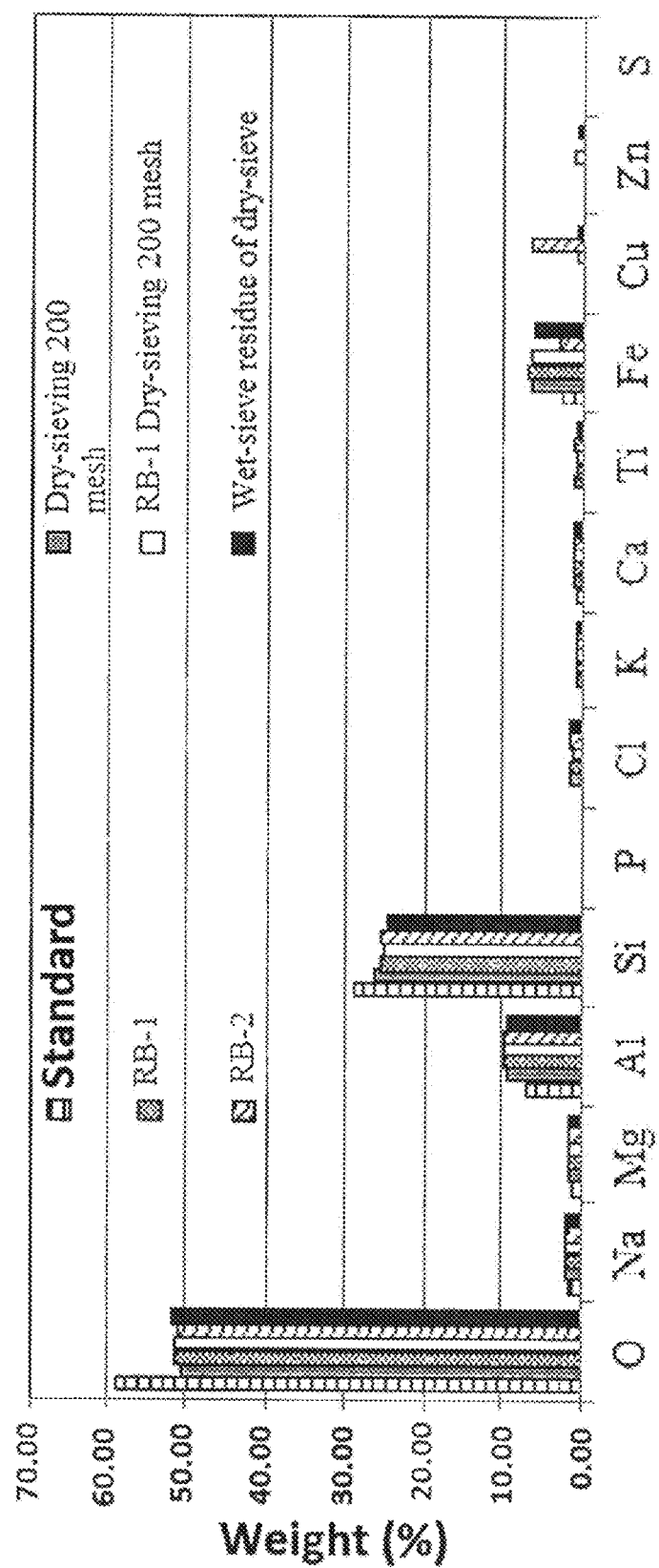
FIG. 4 shows the weight percentages retained of different raw bentonite samples, as measured by scanning electron microscopy (SEM) after being subjected to different purification procedures.'

Different purification methods were applied onto the Khulay area raw bentonite samples RB-1 and RB-2: dry-sieving through 200 mesh (DS-1, DS-2; size <75 μm), wet-sieving with a mesh with diameter opening greater than 200 mesh (WS-1; size >75 μm) wet-sieving through 200 mesh (WS-2, WS-3; 63 μm<size <75 μm), 350 mesh (WS-4; 38 μm<size <63 μm) and 400 mesh (WS-5; size <38 μm), dispersion in deionized water with sedimentation and hexametaphosphate (SD-1, SD-2) or without hexametaphosphate (SD-3). The SEM results for the bentonite samples purified with different techniques are compared to their unpurified forms and standard bentonite in Table 1 and FIG. 4.

TABLE 1

SEM results for bentonite samples purified through different methods.

| Element | Standard | RB-1 | RB-2 | DS-1 | DS-2 | WS-1 | WS-2 | WS-3 | WS-4 | WS-5 | SD-1 | SD-2 | SD-3 |
|---|---|---|---|---|---|---|---|---|---|---|---|---|---|
| O | 58.65 | 50.88 | 51.19 | 50.62 | 51.30 | 57.27 | 51.82 | 51.67 | 52.37 | 55.46 | 54.04 | 51.19 | 54.52 |
| Na | 1.39 | 1.77 | 1.73 | 1.73 | 1.69 | 0.79 | 0.88 | 1.79 | 0.80 | 1.13 | 2.35 | 1.73 | 0.75 |
| Mg | 0.93 | 1.36 | 1.46 | 1.43 | 1.44 | 1.41 | 1.63 | 1.36 | 1.50 | 1.55 | 1.58 | 1.46 | 1.40 |
| Al | 6.83 | 9.49 | 9.59 | 9.44 | 9.56 | 8.70 | 10.74 | 9.46 | 9.80 | 9.26 | 8.87 | 9.59 | 9.16 |
| Si | 28.90 | 25.31 | 25.10 | 26.24 | 25.28 | 22.97 | 26.17 | 24.80 | 27.32 | 24.57 | 24.30 | 25.10 | 24.08 |
| P | | | | | | | | | | | 1.25 | | |
| Cl | | 1.60 | 1.22 | 1.51 | 1.40 | 0.43 | 0.74 | 1.39 | 0.45 | 1.25 | 0.98 | 1.22 | 0.14 |
| K | 0.19 | 0.59 | 0.54 | 0.61 | 0.60 | 1.68 | 0.43 | 0.56 | 0.55 | 0.48 | | 0.54 | 0.58 |
| Ca | 0.48 | 0.89 | 0.91 | 0.98 | 0.95 | 0.65 | 0.96 | 0.87 | 0.92 | 0.95 | 0.80 | 0.91 | 0.82 |
| Ti | | 0.89 | 0.83 | 0.93 | 0.81 | 1.42 | 0.88 | 0.79 | 0.78 | 0.70 | 0.53 | 0.83 | 0.79 |
| Fe | 2.69 | 2.83 | 6.64 | 6.51 | 6.97 | 5.63 | 5.76 | 6.13 | 5.52 | 4.65 | 5.59 | 6.64 | 5.53 |
| Cu | | 6.57 | 0.74 | | | | | | 0.82 | | | 0.89 | 1.28 |
| Zn | | | 0.88 | | | | | | 0.71 | | | 0.88 | 0.94 |
| S | 0.15 | | | | | | | | | | | | |
| Total | 100% | 100% | 100% | 100% | 100% | 101% | 100% | 100% | 100% | 100% | 100% | 100% | 100% |
| Na/Ca ratio | 2.896 | 1.978 | 1.891 | 1.756 | 1.789 | 1.209 | 0.913 | 2.043 | 0.873 | 1.182 | 2.950 | 1.891 | 0.915 |

Hence, in this example it is shown that simple purification methods can be used to produce pure bentonite with good quality out of the local bentonite from the Khulays. Wet-sieving and dispersion in deionized water with or without hexametaphosphate gave the purest bentonite compared to grinding and mechanically dry sieving.

EXAMPLE 3

Determination of Clay Content by Hydrometer Analysis

Figure 5:
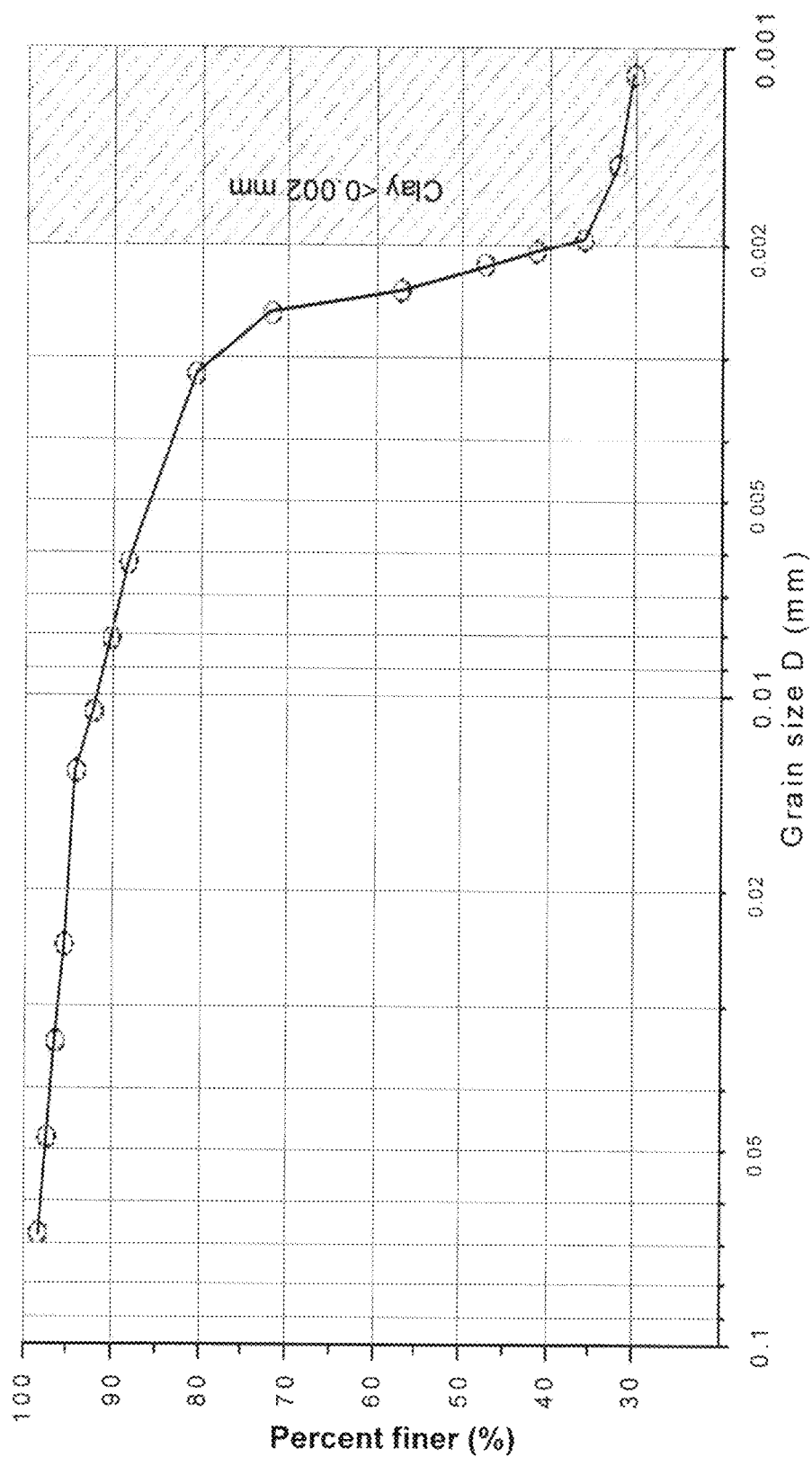
FIG. 5 shows the clay content for sample DS-1 as revealed by hydrometer analysis.

The clay content of the various purified bentonite samples from Example 2 was estimated by hydrometer analysis. The particle size distribution was measured for the small size particles of clay in addition to clay, sand and silt content as shown in FIG. 5 for sample DS-1 (raw bentonite sample RB-1 dry-sieved through a 200 mesh). When the sample was mixed with water the particles settled at different velocities, depending on their shape, size, weight and viscosity of water. The velocity of soil particles can be expressed by Stokes' law. Since the silt has a higher grain size than clay (clay is ~4 μm while sand has 0.45-2 mm), the silt will fall to the bottom before the clay does, leaving only silt and clay particles in suspension. Then silt settles and leaves only clay in the suspension. Dry sieved sample DS-1 contains 35% clay, while wet sieved samples are almost 100% clay. The chemical and mineralogy composition of purified bentonite has almost matched the standard grade following the removal of the impurities through wet-sieving.

EXAMPLE 4

Particle Size Distribution Analysis

Figure 6:
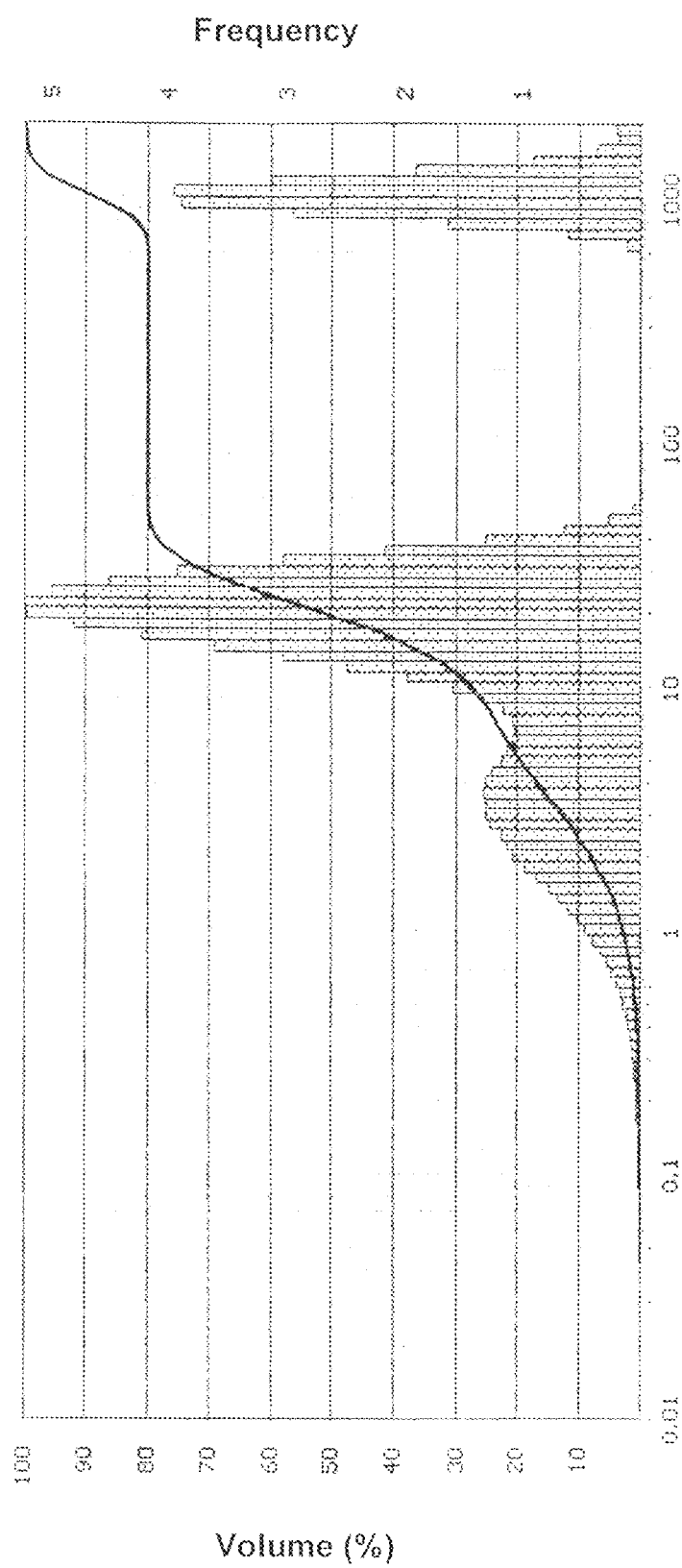
FIG. 6 shows the particle size distribution in terms of volume percentage and frequency for raw, unsieved bentonite samples RB-1 and RB-2.
Figure 7:
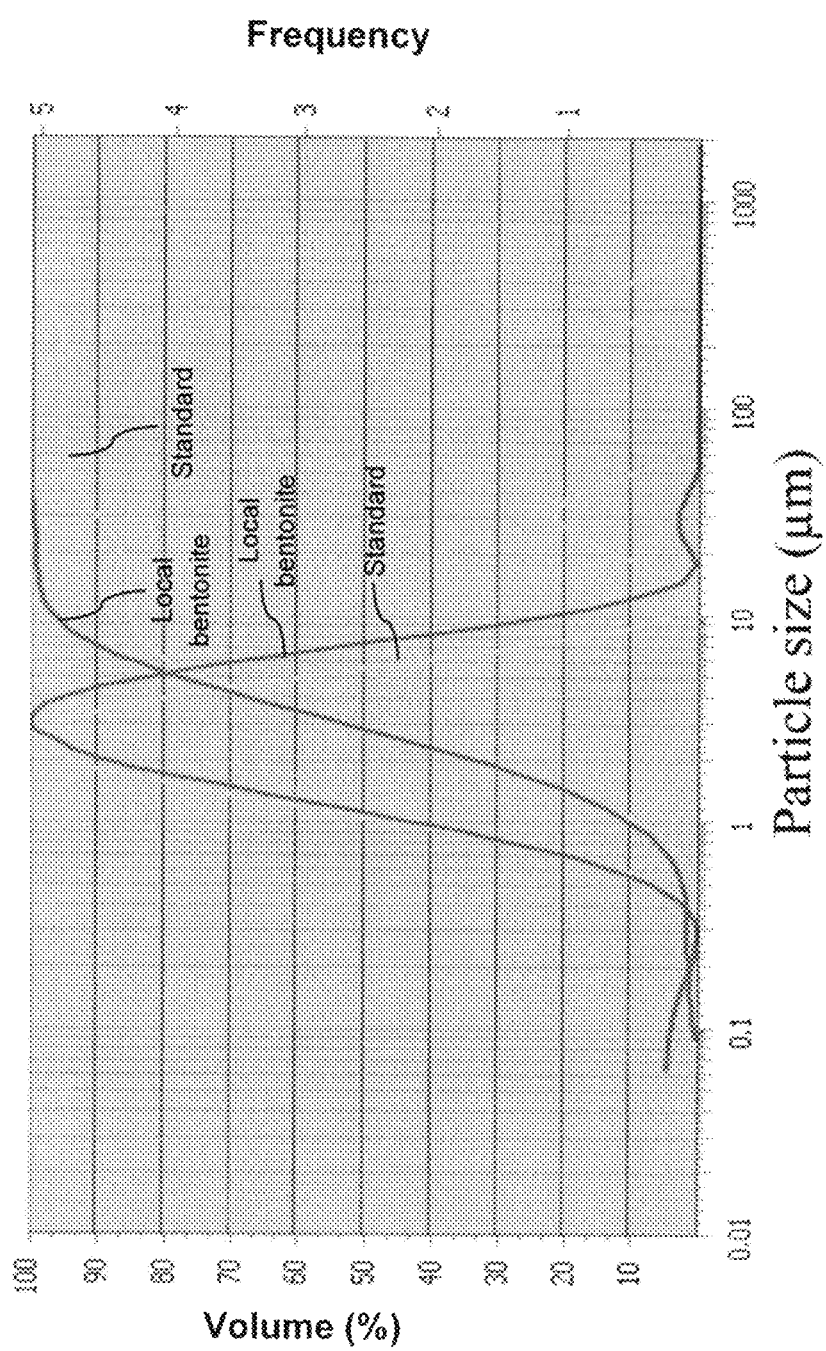
FIG. 7 shows the particle size distribution in terms of volume percentage and frequency for wet-sieved local or standard bentonite passed through 400 mesh (<38 μm).

A Frisch-type particle size analyzer (PSA) was used to obtain the full particle size distribution of raw bentonite derived from the Khulays (RB-1 and RB-2 samples). The results show raw bentonite wide range of particle sizes from 0.8 µm up to 2000 µm. The findings from RB-1 and RB-2 are identical as shown in FIG. 6. After purification, the larger particles are removed. FIG. 7 shows particle size distribution for wet-sieved samples (400 mesh) after sedimentation. The majority of impurities have been removed and the size distribution matches that of standard bentonite. Table2 summarizes the comparison between raw local bentonite and standard bentonite.

TABLE 2

Comparison of particle size of raw local bentonite and standard bentonite.

| Vol. (%) | Particle size of raw local bentonite (µm) | Particle size of standard bentonite (µm) |
|---|---|---|
| 5 | 0.8 | 0.7 |
| 10 | 1.1 | 1 |
| 25 | 1.6 | 1.6 |
| 50 | 2.8 | 2.8 |
| 75 | 5 | 4.7 |
| 90 | 29.8 | 7 |
| 95 | 57.4 | 8.9 |
| 99 | 395.3 | 18.3 |

EXAMPLE 5

Evaluation of Bentonite Stability

Figure 8:
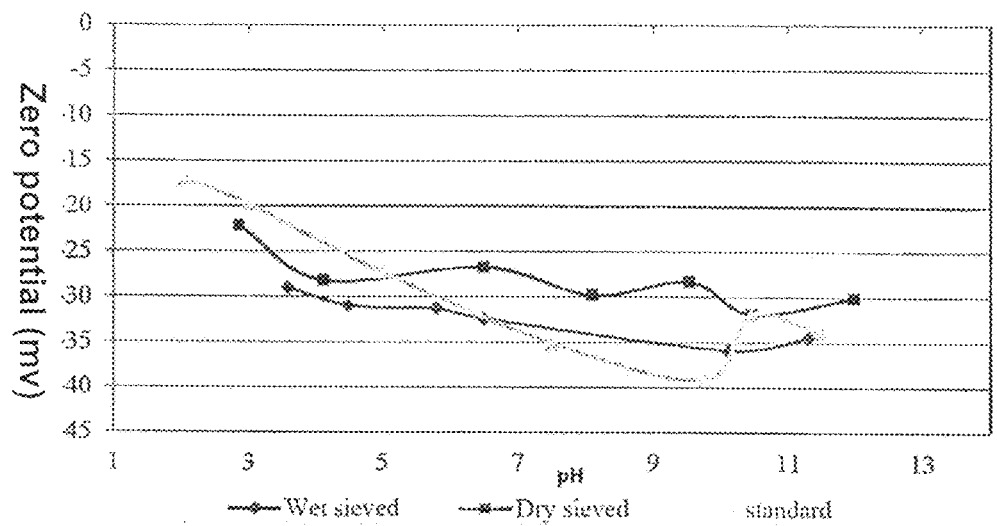
FIG. 8 shows the zeta potential values for standard, dry-sieved and wet-sieved bentonite samples.

The stability of pure bentonite was evaluated using zeta potential (ZP) which is a measurement of particle charges. FIG. 8 shows the ZP measurements for standard bentonite, dry-sieved bentonite and wet-sieved bentonite at different pH values.

EXAMPLE 6

Activation by Soda Ash, Thermal Treatment and Continuous Stirring

Raw bentonite in natural form without treatment may not be qualified as drilling fluid additives even when it is rich in montmorillonite or if it possesses good sodium quality. Despite the aforementioned qualities, raw bentonite may not deliver the required functions such as viscosity and filtration control (Bol, G. "Bentonite Quality and Quality Evaluation Methods" SPE Drilling Engineering 1(04):288-296, August 1986—incorporated herein by reference in its entirety). Bentonite performance and properties can be enhanced by employing different methods of treatments, such as inorganic additives. Addition of soda ash is well-known process to increase bentonite quality (Karagüzel, C. Ç etinel, T., Boylu, F., Ç inku, K., Ç elik, M. S. "Activation of Na, Ca)-bentonites with soda and MgO and their utilization as drilling mud—incorporated herein by reference in its entirety). Only 2-4% of the soda ash (by weight per weight of bentonite) can enhance bentonite properties. Sodium content, usually measured as a Na/Ca ratio, affects disperse characteristics and other physical properties of bentonite (Lebedenko, F., Plée, D. "Some Consideration on the Ageing of $Na_2CO_3$-activated bentonites" Applied Clay Science 3(1): 1-10 Jan. 1988—incorporated herein by reference in its entirety).

Figure 9:
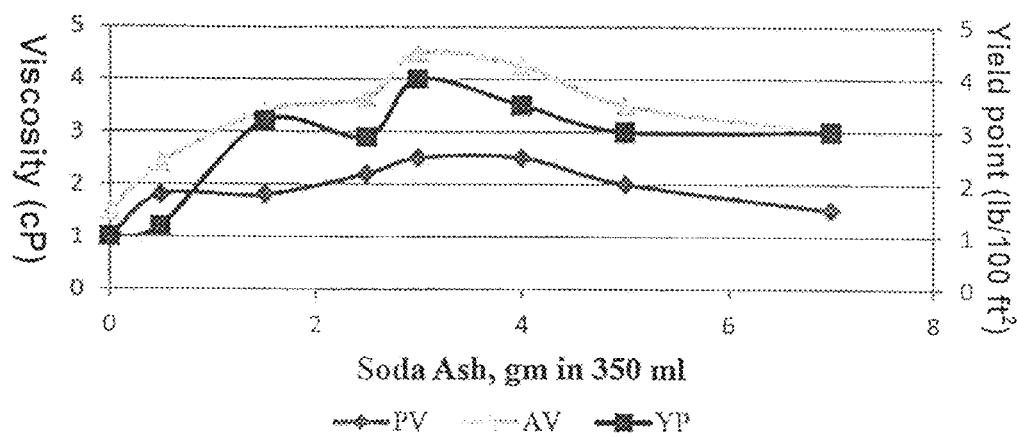
FIG. 9 shows the effect of soda ash on plastic viscosity (PV), yield point (YP) and apparent viscosity (AV) (without heating and stirring).
Figure 10:
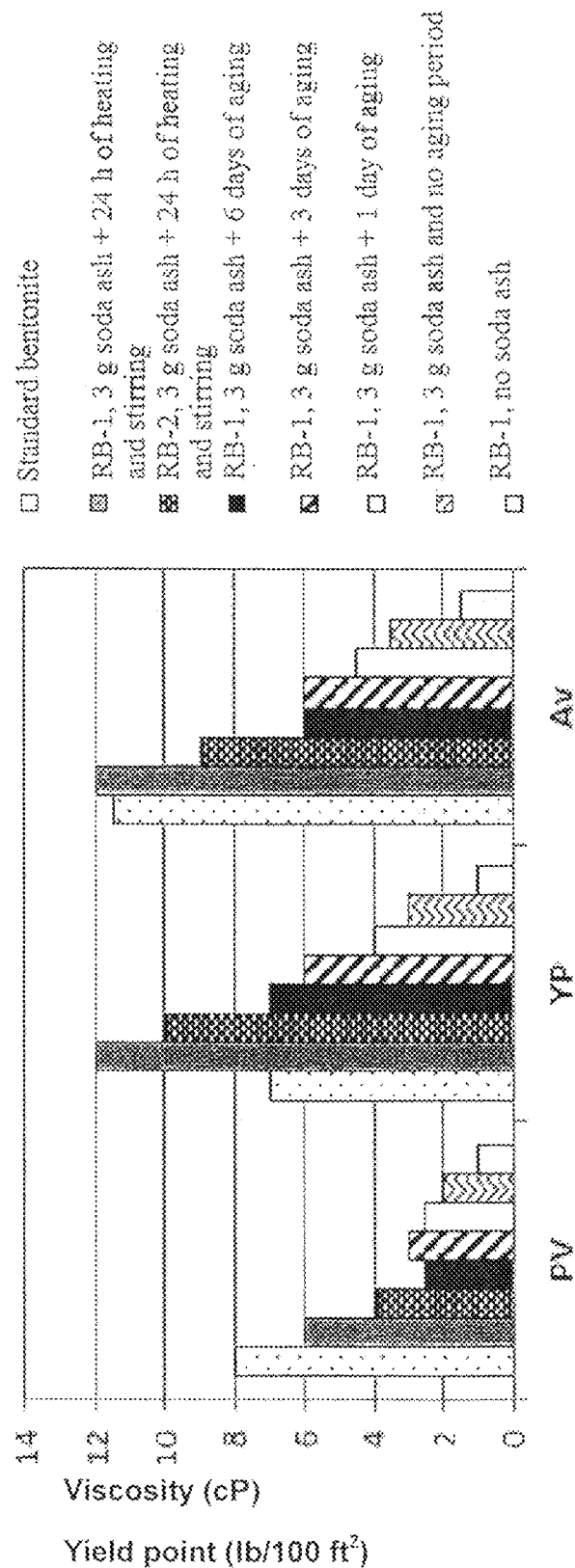
FIG. 10 shows the effect of aging on the rheology of different treated bentonite samples.
Figure 11:
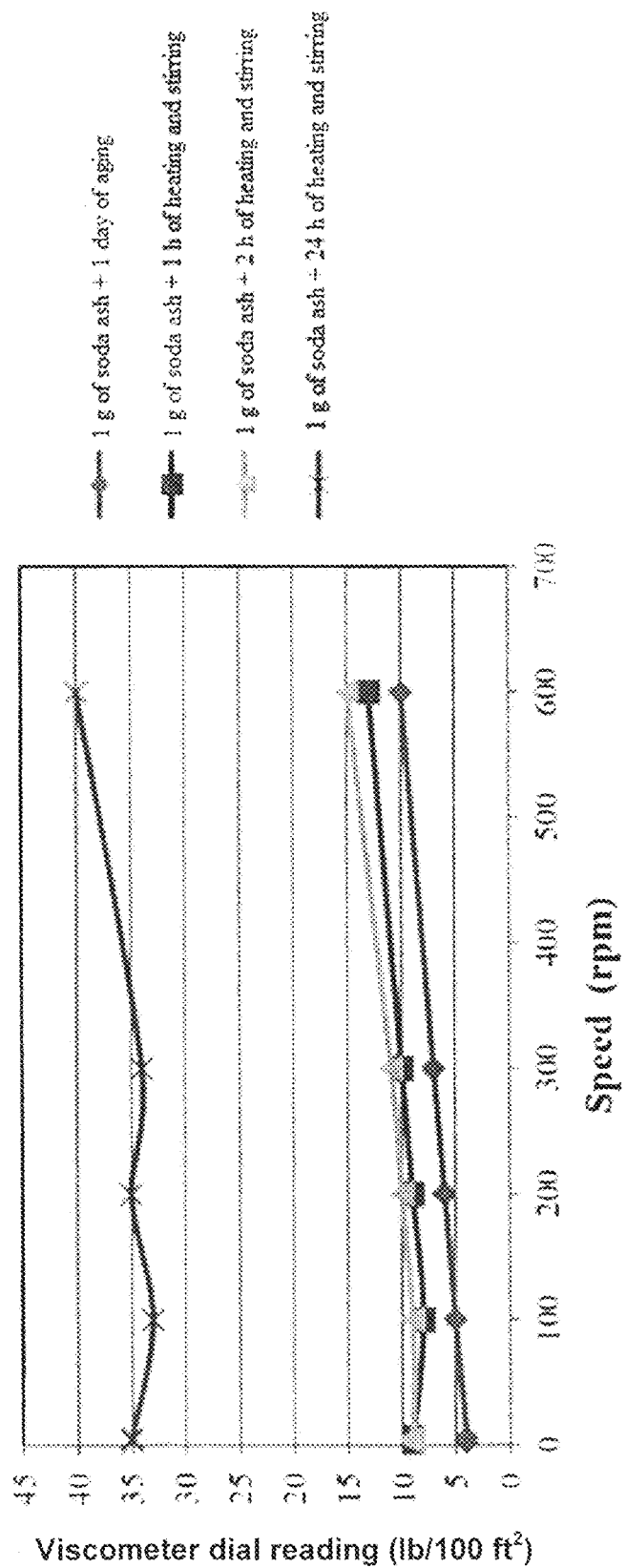
FIG. 11 shows the impact of aging and stirring on the viscosity of the soda ash-treated RB-2 sample.

The two batches of local bentonite from the Khulay area, RB-1 and RB-2 were treated with soda ash and aged for different times. A soda ash solution was prepared by adding 1-3 g to 350 ml of distilled water and mixing for 5 min, resulting in a final soda ash concentration of 0.28-0.86% (weight/volume based on volume of water or weight/weight based on weight of water). After that, 22.5 g of bentonite (or 6.4% by weight per weight of water) was added to the prepared soda ash solution. The amount of soda ash is therefore 4-13% by weight based on the weight of the bentonite. Instead of aging for several days after the addition of the bentonite to the soda ash solution, the Na-activation and swelling process was then enhanced for some samples by heating and continuously stirring the bentonite-soda ash suspension at 65-70° C. for 24 hours. The soda ash treatment and aging results are shown in Table 3 as well as FIGS. 9, 10 and 11. Apparent viscosity and plastic viscosity increased significantly and a peak was observed when 1 g and 3 g of soda ash were used in the treatment process, as shown in FIGS. 9 and 11.

TABLE 3

Impact of soda ash treatment followed by heating and stirring on rheology.

| Property | Standard bentonite | RB-1 | RB-2 | Treated RB-1 (3 g soda ash + 24 h of heating and stirring) | Treated RB-1 (1 g soda ash + 24 h of heating and stirring) |
|---|---|---|---|---|---|
| Apparent viscosity(cP) | 11.5 | 1.3 | 2.2 | 12 | 20 |
| Plastic viscosity (cP) | 8 | 1 | 2 | 6 | 6 |
| Yield point (lb/100 ft²) | 7 | 1.5 | 0.5 | 12 | 28 |
| Filtration (ml) | 15 | 75 | 86.5 | 38.3 | 28.4 |
| Yield/plastic viscosity ratio | 0.87 | 1.5 | 0.25 | 2 | 4.6 |
| Na/Ca ratio | 2.896 | 1.97 | 1.78 | 2.04 | 2.950 |

The soda ash activation method is usually conducted by adding 2-4% of soda ash (percentage based on weight of bentonite) to water. Then, bentonite is added and mixed to allow ion exchange of sodium and calcium to convert Ca-bentonite to Na-bentonite and to increase swelling capacity. In the present disclosure, the soda ash concentration used in the activation step is 4-13%. Importantly, heating at about 70° C. and continuous stirring for a specific time is introduced to the bentonite-soda ash suspension to enhance the Na-activation and the swelling process. At the end of the hot stirring process, water lost due to evaporation, which is minimal, is easily compensated for by deionized water produced from the ion exchange to maintain the same bentonite concentration in the suspension.

EXAMPLE 7

API Filtration of Bentonite Samples

Figure 12:
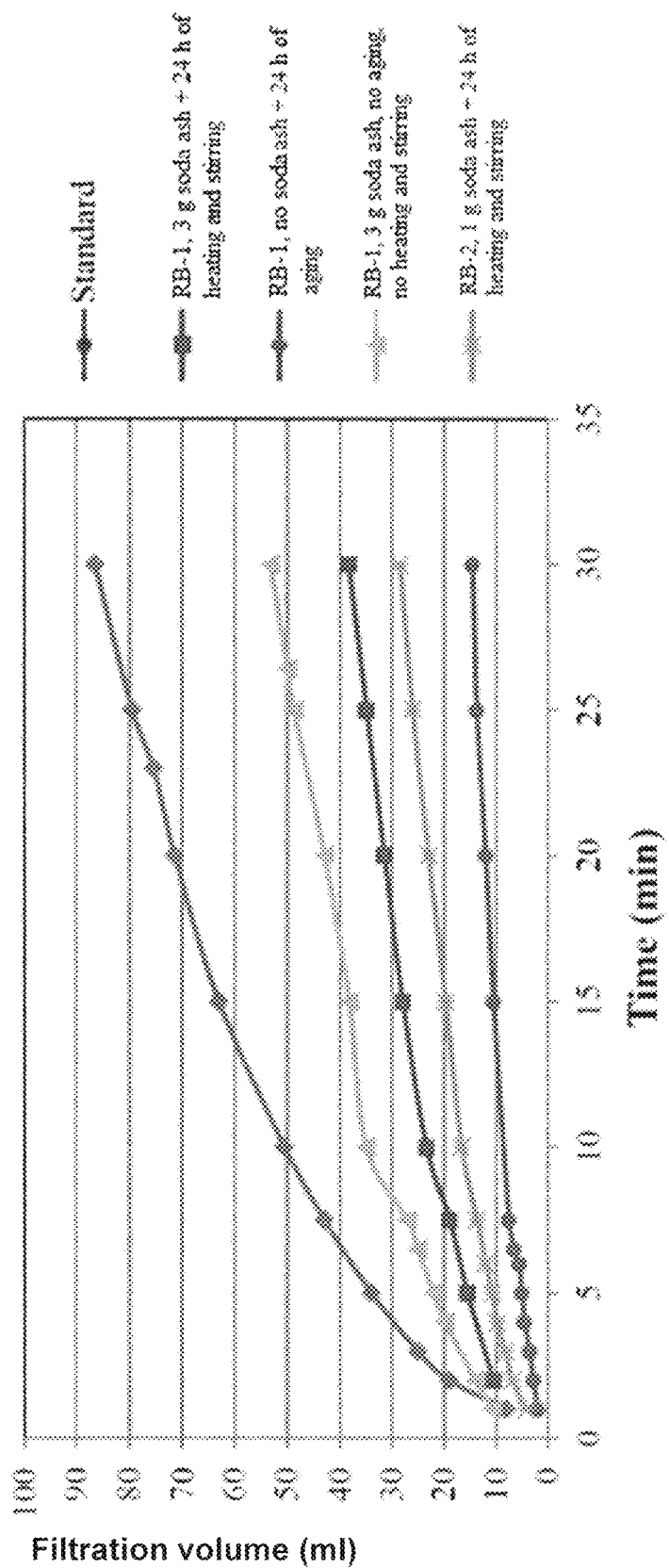
FIG. 12 compares the low pressure, low temperature API filtration volumes of 1 g or 3 g of soda ash on standard bentonite, RB-1 and RB-2 local bentonite samples.

Filtration through API filter press was performed to determine the water hold capacity of various bentonite suspensions. FIG. 12 shows that water control increased with sodium activation and the heated and stirred samples exhibited the best lowest possible filtration results. Bentonite is used in drilling fluids with 80% for the upper formation or 5% for oil zones. The 28 ml of filtration is acceptable for the upper formations drilling in 80% bentonite mud. This section of the well can tolerate that filtration, but for the pay zone a maximum of 15 ml should be maintained to avoid formation damage which is usually controlled by filtration additives such as starch.

Figure 13:
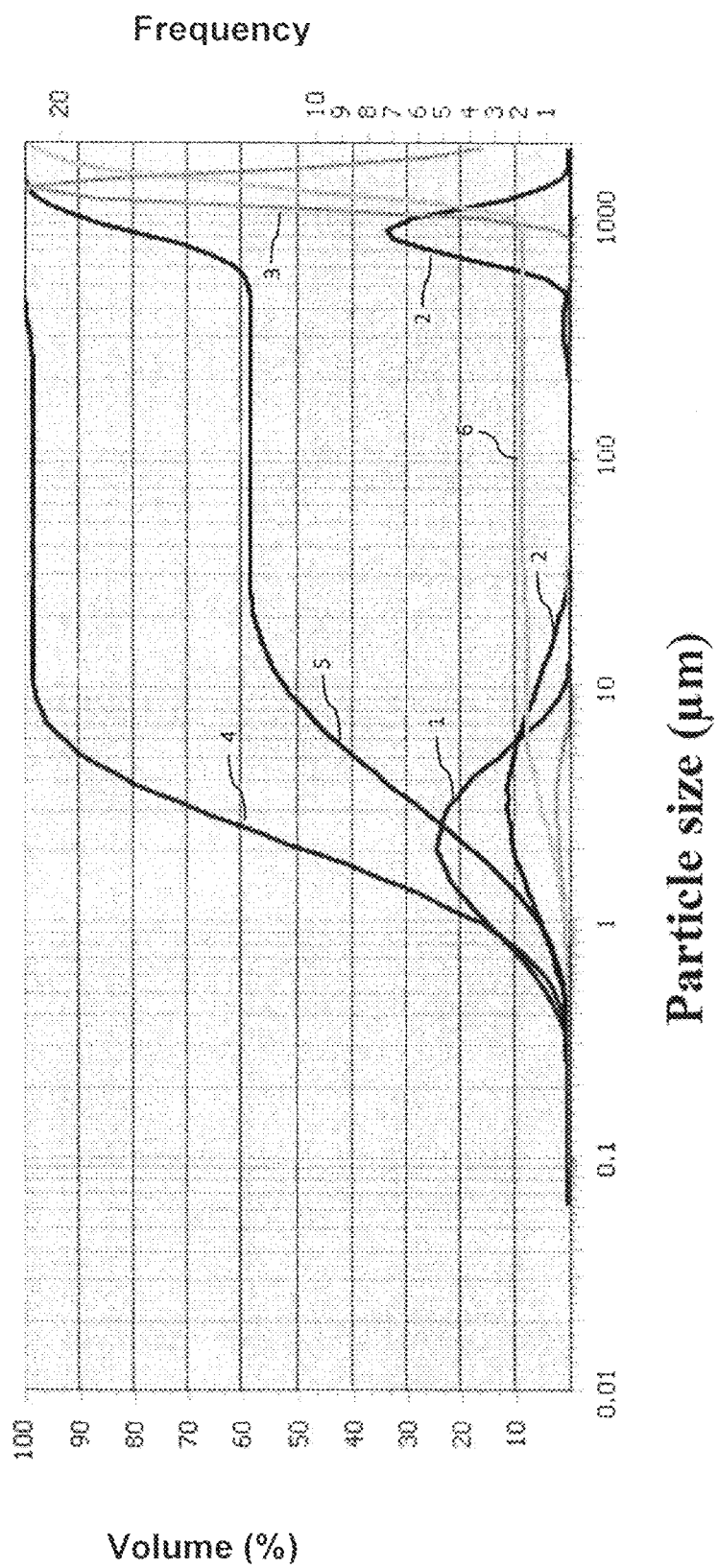
FIG. 13 shows the particle size distribution in terms of volume percentage and frequency for different bentonite samples: standard bentonite, local raw bentonite that has been treated with soda ash and local raw bentonite that has been treated with soda ash then heated and stirred for 24 h.

FIG. 13 shows the combined effect of heating and stirring on particle size distribution. The distribution of untreated bentonite has 90% of the particles below 5 With soda ash treatment, 90% of the particles were below 20 μm. However, major increase in particle size is achieved when both heating and stirring for 24 h was implemented where 90% of the particles were around 1000 μm. This indicated that heating and stirring greatly enhanced swelling capacity that led to the improvement in rheological properties as shown in FIG. 12.

EXAMPLE 8

Heating and Stirring Durations

To obtain more information on swelling kinetics the combined heating/stirring process was repeated at different times to obtain the minimum time required to achieve the desired enhancement in viscosity.

Figure 14:
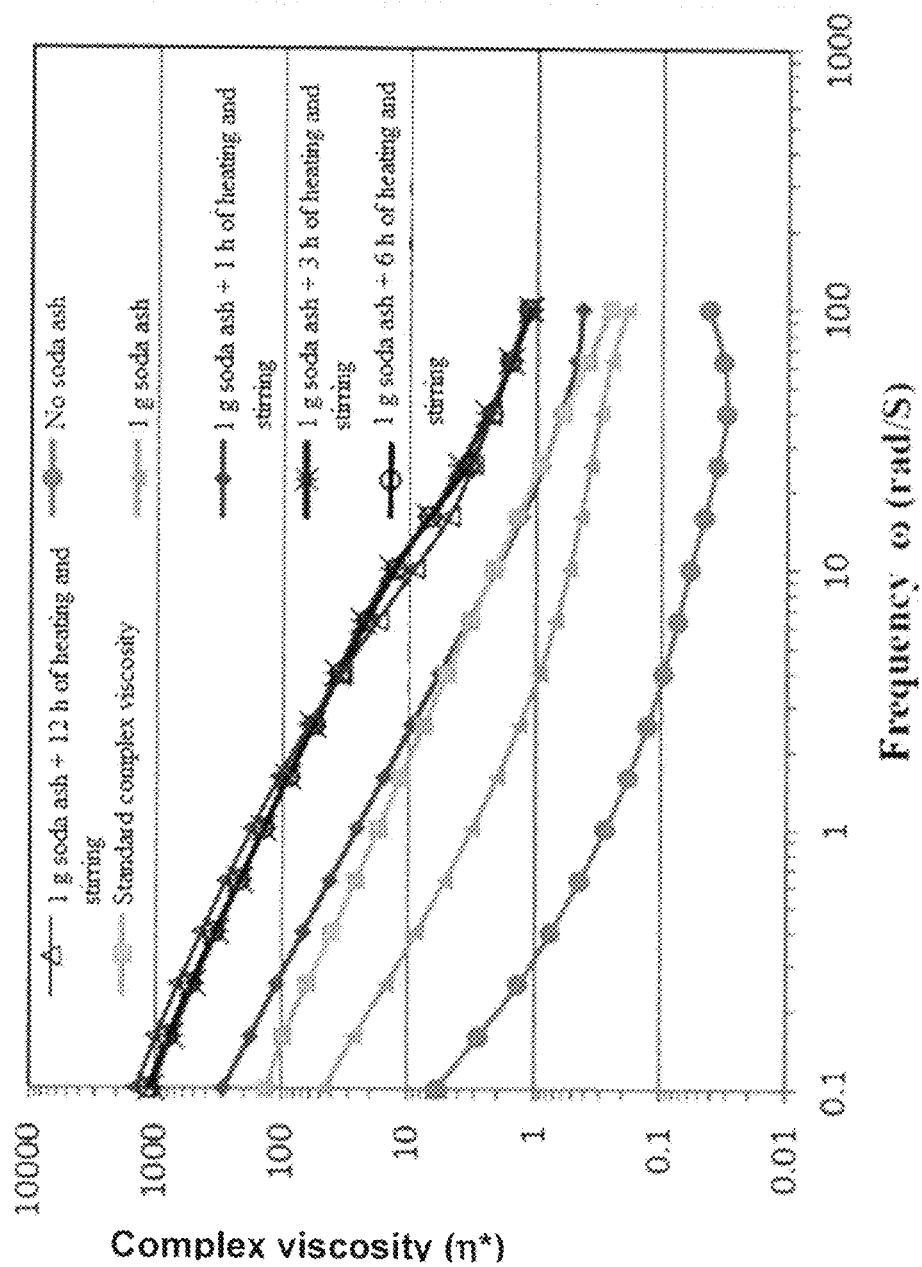
FIG. 14 illustrates the influence of heating and stirring time on complex viscosity for 1 g of soda ash mixed with RB-1 local bentonite sample.
Figure 15:
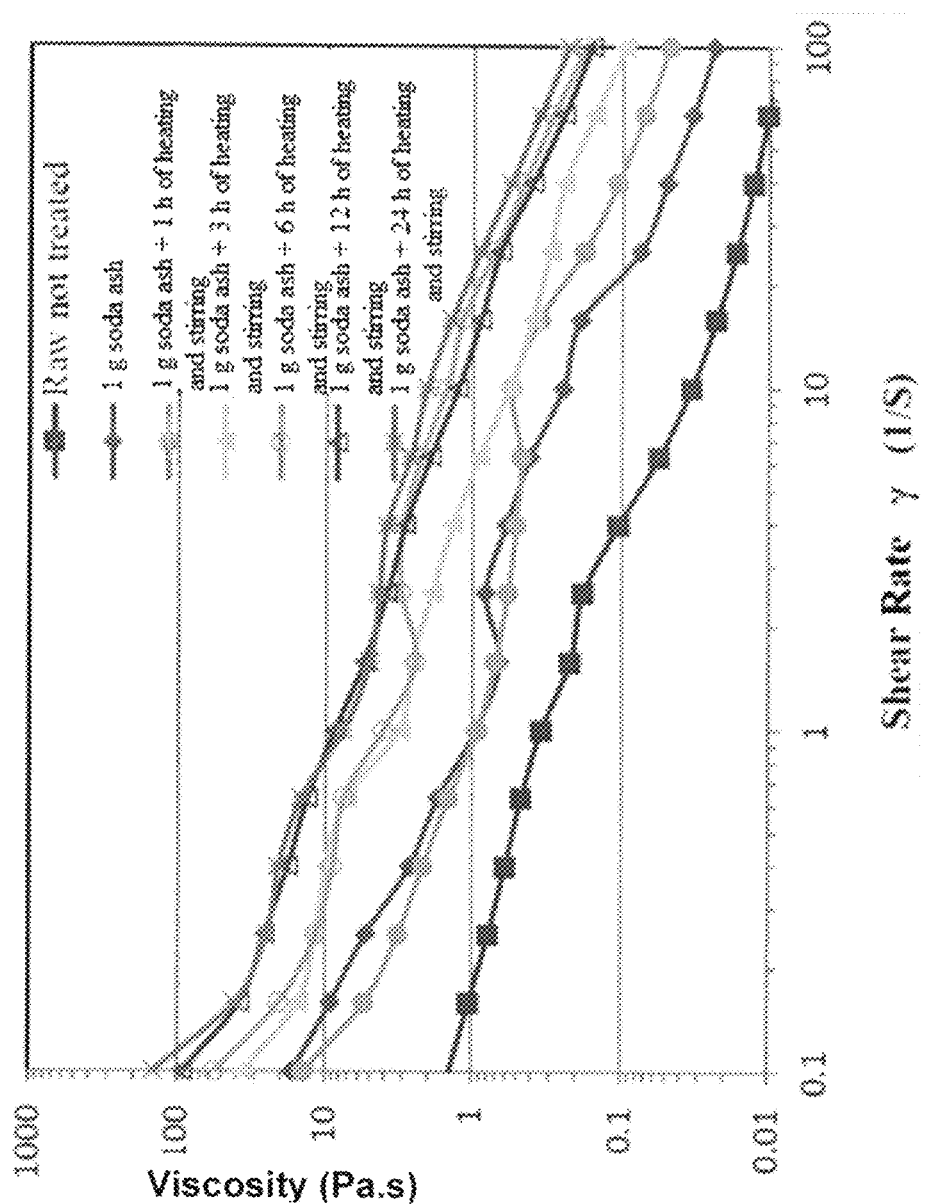
FIG. 15 illustrates the influence of heating and stirring time on shear viscosity for 1 g of soda ash mixed with RB-1 local bentonite sample.
Figure 16:
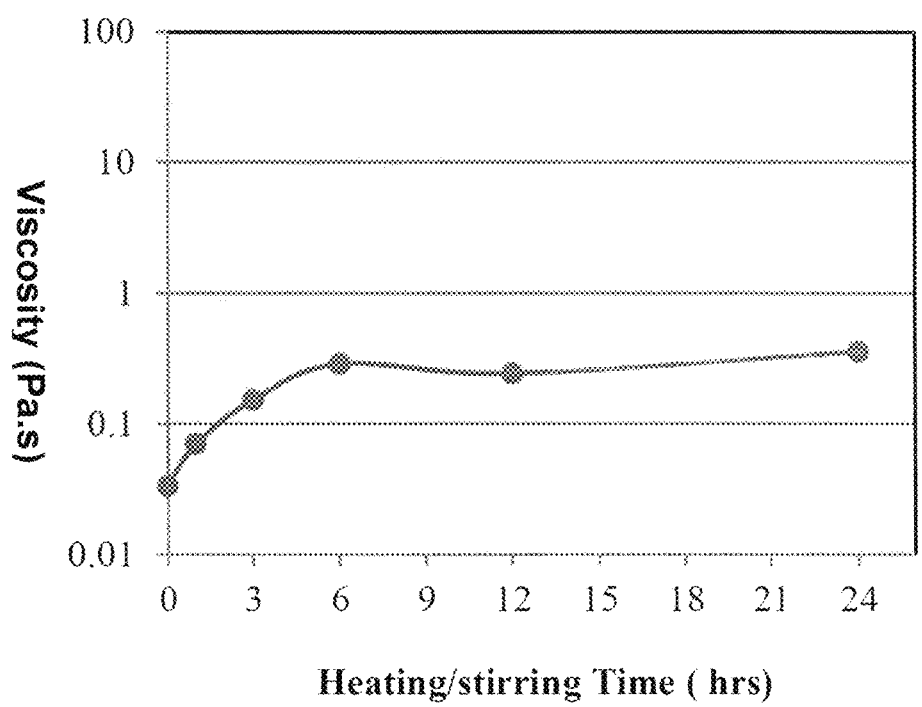
FIG. 16 illustrates the influence of heating and stirring on viscosity at a high shear rate (64 s$^{-1}$).
Figure 17:
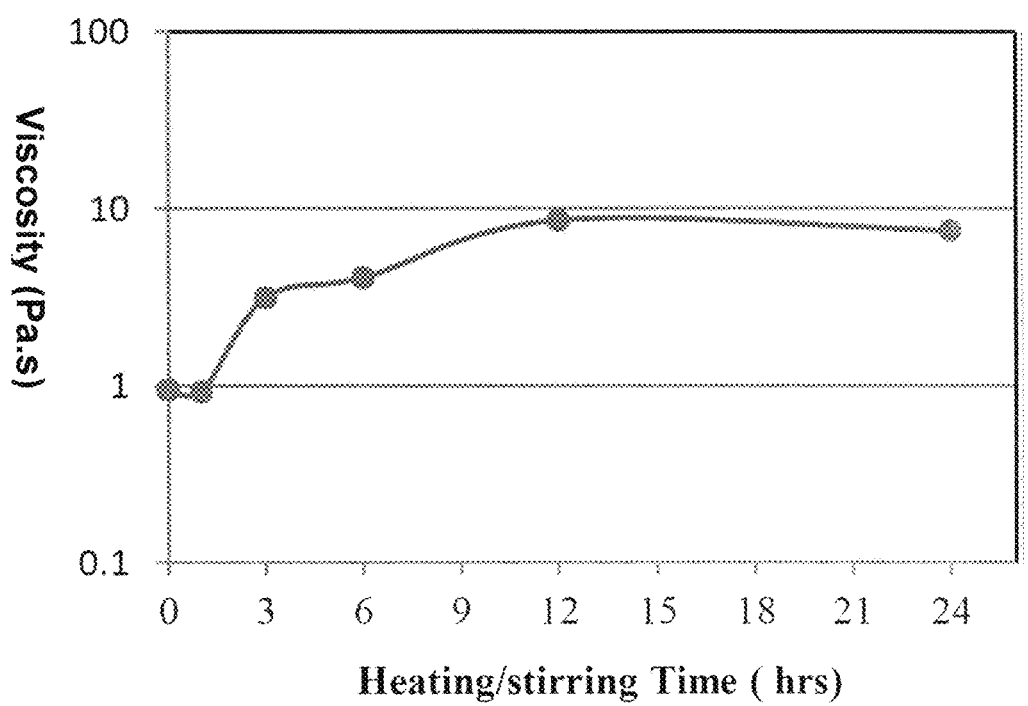
FIG. 17 illustrates the influence of heating and stirring on viscosity at a low shear rate (1 s$^{-1}$).

The heating/stirring duration was varied from 1-24 h. FIGS. 14 and 15 indicate that a minimum of 3-6 h is needed to achieve the maximum viscosity. FIGS. 16 and 17 show the viscosity buildup with heating time at low and high shear rate. FIGS. 16 and 17 indicate that at both high and low shear rates, after 6 h of heating the viscosity can reach its peak and no further significant increment will take place. Lower heating times could be used to achieve optimum values.

EXAMPLE 9

Comparison of Soda Ash-Hot Stirring to Hot Rolling Treatment

In bentonite water suspension preparation, API recommends using hot rolling for 16 h to allow for dehydration. The hot rolling conditions are described by API as 150° F. (65° C.) for 16 h at a pressure of 120 psi in closed pressurized cell. The hot rolling procedure, when applied onto the local bentonite, successfully increased the rheological properties of the bentonite but not enough to satisfy the API specifications.

On the other hand, the method of combined heating and stirring accompanying soda ash activation as outlined in Example 6, increased the swelling capacity significantly. The average particle size increased from 2.4 μm for untreated bentonite to 1286.9 μm. The rheological properties and fluid control properties have enhanced and achieved the target standard API specifications. Therefore, the obtained pure Ca-bentonite from natural deposit in Khulays area can be modified to Na-bentonite and sufficiently used in drilling fluid and cementing additives using the new hot stirring method.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of converting calcium bentonite to sodium bentonite, comprising:
    adding a calcium bentonite sample to a sodium carbonate aqueous solution to form a bentonite suspension comprising calcium bentonite, sodium carbonate, and water, wherein the bentonite suspension has a sodium carbonate/calcium bentonite weight ratio of 1:7 to 1:23 and a calcium bentonite concentration of 5-10 wt % based on a total weight of water; and
    continuously heating and stirring the bentonite suspension at 60-80° C. for 6-24 hours to form sodium bentonite and calcium carbonate.

2. The method of claim 1, wherein the sodium carbonate aqueous solution has a sodium carbonate concentration of no more than 1% by weight based on a total weight of water.

3. The method of claim 1, wherein the sodium bentonite formed has an apparent viscosity of at least 15 cP.

4. The method of claim 1, wherein the sodium bentonite formed has a yield point of no more than 30 lb/100 ft$^2$.

5. The method of claim 1, wherein the sodium bentonite formed has a Na/Ca molar ratio of at least 2.5.

6. The method of claim 1, wherein the sodium bentonite formed has a viscometer dial reading of 33-35 lb/100 ft$^2$ at 300 rpm and 39-40 lb/100 ft$^2$ at 600 rpm.

7. The method of claim 1, wherein an average particle size of the sodium bentonite is more than 500 times larger than an average particle size of the calcium bentonite sample.

8. The method of claim 1, wherein the calcium bentonite sample is a raw bentonite sample that has not been purified.

9. The method of claim 1, wherein the calcium bentonite sample has been purified by at least one method selected from the group consisting of dry-sieving, wet-sieving, dispersion in deionized water with hexametaphosphate, dispersion in deionized water without hexametaphosphate and sedimentation.

10. The method of claim 1, wherein the sodium carbonate aqueous solution has a sodium carbonate concentration of 0.28-0.86% by weight based on a total weight of water.

11. The method of claim 1, wherein the sodium carbonate/calcium bentonite weight ratio is 1:20 to 1:23.

12. The method of claim 1, wherein the bentonite suspension is heated at 65-70° C.

13. The method of claim 1, wherein the bentonite suspension is stirred for 12-24 hours.

14. The method of claim 1, wherein the sodium bentonite formed has a Na/Ca molar ratio of 2.8-3.0.

15. The method of claim 1, wherein the sodium bentonite formed has a particle size of 1100-1400 μm.

16. The method of claim 1, wherein the sodium bentonite formed has a yield point of 12-28 lb/100 ft$^2$.

* * * * *